United States Patent [19]
Demarest et al.

[11] Patent Number: 5,733,015
[45] Date of Patent: Mar. 31, 1998

[54] WHEEL WITH A SEMI-PERMANENTLY ENCLOSED ANNULAR MATERIAL

[75] Inventors: Charles H. Demarest, Boulder; Paul C. Jensen, Broomfield; Gerard F. Lutz, Golden, all of Colo.

[73] Assignee: Kryptonics, Inc., Louisville, Colo.

[21] Appl. No.: 566,840

[22] Filed: Dec. 4, 1995

[51] Int. Cl.$^6$ .................................................. B60B 3/08
[52] U.S. Cl. ............................ 301/5.3; 152/312; 152/403
[58] Field of Search ............................ 152/323, 324, 152/329, 393, 394, 396, 397, 403, 404, 405, 5, 7, 310, 312, 311, 313, 318; 301/5.3, 5.7, 64.7; 280/11.22, 11.23

[56] References Cited

U.S. PATENT DOCUMENTS

| | | |
|---|---|---|
| 585,929 | 7/1897 | DeBorde . |
| 700,509 | 5/1902 | Knauber . |
| 807,748 | 12/1905 | Knadler ........................ 152/382 X |
| 905,805 | 12/1908 | King .............................. 152/403 X |
| 920,523 | 4/1909 | Beckers ......................... 152/318 X |
| 1,120,552 | 12/1914 | Sherman et al. . |
| 1,310,113 | 7/1919 | Culmer . |
| 1,336,790 | 4/1920 | Simms . |
| 1,469,904 | 10/1923 | Goodman . |
| 1,566,609 | 12/1925 | LARSEN ........................... 301/5.3 |
| 1,625,644 | 4/1927 | Fisher . |
| 1,719,218 | 7/1929 | Gammeter . |
| 2,073,703 | 3/1937 | Parrish .......................... 208/181 |
| 2,152,684 | 11/1939 | Grange et al. ................. 301/5.3 |

(List continued on next page.)

FOREIGN PATENT DOCUMENTS

| | | | |
|---|---|---|---|
| 544431 | 1/1922 | France ........................ 152/404 |
| 3372 | 2/1896 | United Kingdom ............ 301/5.7 |

*Primary Examiner*—Russell D. Stormer
*Attorney, Agent, or Firm*—Greenlee, Winner and Sullivan, P.C.

[57] ABSTRACT

A wheel, preferably adaptable for use with a skate, is provided having a semi-permanent stiffness-modulating insert. The wheel comprises a toroidal wheel component having a hollow toroidal core which can be filled with a stiffness-modulating material. The wheel is split along a line from the inner circumference of the toroidal wheel component to the inner circumference of the core so as to allow for insertion of the stiffness-modulating material. The toroidal wheel component is preferably molded with the split edges slightly spaced apart from each other. In use the edges are held together in abutment with each other or with a toroidal spacer placed between them, preferably by wheel hubs engaging with each other and with the toroidal wheel component of the wheel.

24 Claims, 5 Drawing Sheets

U.S. PATENT DOCUMENTS

| | | | |
|---|---|---|---|
| 2,237,182 | 4/1941 | Iknayan | 152/313 X |
| 2,261,823 | 11/1941 | Ballard | 301/5.3 |
| 2,271,166 | 1/1942 | Weiss | 74/230.8 |
| 2,273,283 | 2/1942 | Pfeiffer | 154/12 |
| 2,451,172 | 10/1948 | Nies | 152/310 |
| 2,559,118 | 7/1951 | Foran | 280/11.23 |
| 2,569,935 | 10/1951 | Lleguilllon et al. | 154/9 |
| 2,709,471 | 5/1955 | Smith et al. | 152/310 |
| 2,722,429 | 11/1955 | Merbler | 280/11.28 |
| 2,871,061 | 1/1959 | Behm et al. | 301/5.3 |
| 3,311,417 | 3/1967 | Uribe | 301/5.7 |
| 3,827,792 | 8/1974 | Hollins | 1452/403 X |
| 3,877,710 | 4/1975 | Nyitrai | 280/11.23 |
| 3,948,303 | 4/1976 | Patrick | 152/327 |
| 4,004,628 | 1/1977 | Tangorra et al. | 152/404 X |
| 4,052,496 | 10/1977 | Goodfellow | 264/251 |
| 4,058,152 | 11/1977 | Beck et al. | 152/310 |
| 4,070,065 | 1/1978 | Heitfield | 301/5.3 |
| 4,198,372 | 4/1980 | Calori | 264/326 |
| 4,206,170 | 6/1980 | Sassaman et al. | 264/310 |
| 4,208,073 | 6/1980 | Hechinger | 301/5.3 |
| 4,218,098 | 8/1980 | Burton | 301/5.7 |
| 4,387,070 | 6/1983 | Cunard et al. | 264/247 |
| 4,514,243 | 4/1985 | Moore, III et al. | 156/113 |
| 4,590,980 | 5/1986 | Kuhn | 152/323 |
| 5,129,709 | 7/1992 | Klamer | 301/5.3 |
| 5,199,727 | 4/1993 | Lai | 280/11.28 |
| 5,308,152 | 5/1994 | Ho | 301/5.3 |
| 5,310,500 | 5/1994 | Gonsior | 301/5.3 |
| 5,312,844 | 5/1994 | Gonsior et al. | 521/99 |
| 5,320,417 | 6/1994 | Trosky | 301/5.3 |
| 5,320,418 | 6/1994 | Chen | 301/5.3 |
| 5,401,037 | 3/1995 | O'Donnell et al. | 280/11.2 |
| 5,460,433 | 10/1995 | Hawley | 301/5.3 |
| 5,524,913 | 6/1996 | Kulbeck | 280/11.22 |
| 5,531,949 | 7/1996 | Heitfiled | 264/135 |
| 5,551,763 | 9/1996 | Alsman | 301/64.7 |
| 5,567,019 | 10/1996 | Raza et al. | 301/5.3 |

WHEEL WITH A SEMI-PERMANENTLY ENCLOSED ANNULAR MATERIAL

FIELD OF THE INVENTION

This invention relates generally to wheels for skates, and in particular to wheels having a semi-permanently enclosed annular material for modifying the overall stiffness of the wheel.

BACKGROUND OF THE INVENTION

Wheels, in many instances, provide not only translational motion, but also deliver a dynamically compliant suspension for travel over surface irregularities. In automobiles, for example, the pneumatic tires along with the spring suspension system permit a comfortable and safe ride over various surface irregularities. In roller skates when elastomeric wheels, typically of polyurethane, widely replaced steel wheels, the quality of the ride was dramatically improved; likewise with skateboards and more recently with inline skates.

Filling tires with various substances in various configurations has been proposed for the improvement of durability of resilient tires since before the turn of the century. U.S. Pat. No. 585,929 of J. DeBorde issued Jul. 6, 1887 for "Tire for Velocipedes" discloses a series of hollow rubber balls inserted within a tire to improve durability. U.S. Pat. No. 1,310,113 of H. H. Culmer issued Jul. 15, 1919 for "Non-puncturable Tire" discloses filling a tire with small resilient bodies to improve durability and resiliency. U.S. Pat. No. 1,469,904 to S. Goodman issued Oct. 9, 1923 for "Resilient Support for Tires" discloses filling tires with strips or pieces of rubber. U.S. Pat. No. 2,451,172 to H. C. Nies issued Oct. 12, 1948 for "Cushion Tire" discloses a tire having a hard metallic core surrounded by small hard rubber balls which is said to generate less heat than tires relying on the flexing of resilient elements during compression or bending to produce the desired cushion effect. U.S. Pat. No. 4,058,152 issued Nov. 15, 1977 to Beck et al. for "Automobile Safety Tires" discloses tubeless automobile tires filled with closed-cell foamed particles of polymer to withstand high impact stress. U.S. Pat. No. 4,514,243 issued Apr. 30, 1985 to Moore, III et al. for "Tire for Wheelchairs and the Like" discloses a tire comprising a soft elastomeric casing extruded over a semi-rigid core to provide resiliency without loss of structural integrity.

Improved skate wheels based on the pneumatic tire model were proposed almost fifty years ago. U.S. Pat. No. 2,073,703 issued Mar. 16, 1937 to F. N. Parrish for "Roller Skate" discloses a tubeless inflatable pneumatic tire for use on roller skates. U.S. Pat. No. 2,261,823 issued Nov. 4, 1941 to R. D. Ballard for "Roller Skate Wheel or Caster" discloses a resilient skate tire filled with a non-compressible liquid or semi-liquid. The tire is designed such that by communicating hydrostatic pressure within the tire uniformly throughout its circumference, the tire is flattened to a minimum degree at the lower side so that the formation of a lump or wrinkle immediately in advance of the point of contact of the tire with the supporting surface as it rolls is minimized. Neither of these patents contains disclosures as to how such a tire is or could be made.

Modern skate wheels are generally made of a compliant, abrasion-resistant molded plastic such as polyurethane. To cushion such a wheel, U.S. Pat. No. 4,070,065 issued Jan. 24, 1978 to Heitfield for "Wheel for Skateboards and Roller Skates" discloses the use of a thin annular groove extending inwardly from the wheel. To provide better traction and shock absorption, U.S. Pat. No. 4,208,073 issued Jun. 17, 1980 to Hechinger for "Wheel for Skateboards and Roller Skates" discloses coaxial wheel portions of urethane and rubber. U.S. Pat. No. 5,129,709 issued Jul. 14, 1992 to Klamer for "Wheel for Roller Skate and the Like," discloses a wheel having a central disk of a hard material and sides flanking a core made of a softer material. U.S. Pat. No. 5,308,152 issued May 3, 1994 to Ho for "Wheel Unit for In-Line Roller Skate" discloses a stable mounting for a wheel member made of an elastomer have a tread and having shock absorbing properties. U.S. Pat. No. 5,310,50 issued May 10, 1994 to Gonsior for "In-Line Skate Wheels" discloses a solid inline skate wheel made from a low-friction material shaped to provide increased surface area contacting the pavement for increased gripping surface when the skater is accelerating. To cut down on friction with the road resulting from wear on the skate wheel, U.S. Pat. No. 5,460,433 issued Oct. 24, 1995 to Hawley for "Skate Wheels" discloses a replaceable solid urethane tire.

A skate wheel having the advantage of a reasonably hard, abrasion resistant outer surface, which provides minimum rolling resistance, but whose overall stiffness can be modified to provide better cushioning is needed. It is an object of this invention to provide such a wheel. The wheel of this invention has a hollow core which may be filled with appropriate stiffness-modifying (also referred to as stiffness-modulating) materials.

Injection molding is a preferred method of making skate wheels. An early patent disclosing a composite metal/nylon skate wheel, U.S. Pat. No. 2,871,061 issued Jan. 27, 1959 to Behm, et al. for "Roller Skate Wheel," discloses a method for injection molding plastic material around a hollow sheet metal wheel shell. U.S. Pat. No. 4,218,098 issued Aug. 19, 1980 to Burton for "Skate Wheel Assembly" discloses an open-ended tire for a skate wheel held on with a tongue and groove arrangement. U.S. Pat. No. 5,312,844 issued May 14, 1994 to Gonsior et al. for "Method of Producing Polyurethane Injection Molded In-Line Skate Wheels" discloses a method for injection molding a polyurethane skate wheel bonded to a hub. None of the foregoing references discloses a method for making skate wheels having a hollow core.

In the vehicle tire art, methods of making hollow wheels are known. U.S. Pat. No. 1,120,552 issued Dec. 8, 1914 to S. A. Sherman et al. for "Tire" and U.S. Pat. No. 1,336,790 issued Apr. 13, 1920 to E. R. Simms for "Vehicle Tire" disclose hollow tires with removable treads. Between the hollow core and the inner circumference of the tire, the tire material is discontinuous or slit, and the edges are held together by being inserted into a wheel hub. U.S. Pat. No. 1,625,644 issued Apr. 19, 1927 to G. F. Fisher for "Manufacture of Cushion Tire" discloses a method of vulcanizing rubber to a base to form a hollow core surrounded by the metal base and the rubber tire. U.S. Pat. No. 2,273,283 issued Feb. 17, 1942 to P. O. Pfeiffer for "Method of Making Vehicle Tires" discloses a sectional mold for manufacturing rubber tires having an internal web structure. U.S. Pat. No. 2,709,471 issued May 31, 1955 to Smith, et al. for "Solid Tire and Method of Making Same" discloses a method for making a solid rubber tire having a core filled with a more resilient cushioning material comprising making a base strip, adding the cushioning material, and an outer hard, durable stock, and vulcanizing. U.S. Pat. No. 3,948,303 issued Apr. 6, 1976 to Patrick for "Replaceable Resilient Tire" discloses a tire having a hollow core with a tear-shaped cross-section having a nylon rod disposed therein. The tire is formed of an elongate body with the free ends in abutment disposed in circular form in a rim.

Methods for molding of skate wheels made of tough, abrasion-resistant materials and having a hollow core in one toroidal piece are needed. It is an object of this invention to provide such methods.

All publications referred to herein are hereby incorporated by reference.

SUMMARY OF THE INVENTION

This invention provides a wheel of a type particularly suitable for use as a skate wheel for conventional roller skates, skate boards, or, preferably, inline skates. The wheel of this invention may also be adapted for other uses for wheels known to the art, such as for furniture, carts, strollers, motorized vehicles and the like. In use, the wheel consists of an outer toroidal wheel component which is preferably made of a relatively hard, abrasion resistant material. It has a hollow core, which in use is toroidal in shape. The hollow core may be filled with a stiffness-modulating material to provide a suitable overall stiffness for the wheel in order to optimally maximize shock absorption, while optimally minimizing rolling resistance, preferably without sacrifice of abrasion resistance, for various types of rolling surfaces.

As used herein, the term "toroidal" refers to shapes which are roughly doughnut or wheel-shaped in that they have a circular outer circumference and a circular inner circumference, thus having a circular diameter in a plane normal to the rolling surface and parallel to the direction of travel. However, the cross-section as viewed by cutting the wheel along one of the radii between the outer and inner circumferences need not be circular in shape, but can be any convenient shape adapted to the process of manufacturing the wheel.

In particular, this invention provides a toroidal wheel component with an outer circumference (rim) for contacting the sidewalk or other rolling surface. Preferably, the outermost half of the toroidal cross-section is shaped like a truncated, flattened ellipse, as shown in FIG. 1. Suitable shapes for this portion of the wheel are known to the art for maximizing wheel efficiency. The innermost half of this cross-section of the wheel is roughly key-shaped, also as shown in FIG. 1. As manufactured, this cross-section of the component has its innermost half split and spread apart, for example as shown in FIG. 3. The innermost half may be spread apart such that the edges are parallel or at any angle convenient to manufacturing of the component, preferably at an angle from 0° to no more than about 45° and more preferably at an angle between about 10° and about 25°. For skate wheels, the distance between the two edges as manufactured is preferably no more than about ¼ inch, and more preferably no more than about 3/16 inch. Wheels for larger vehicles would have the toroidal component scaled up to be proportional to wheels for skates.

The toroidal wheel component of this invention is described as a single component herein, and preferably is formed by a manufacturing process producing a single piece such as injection molding or liquid urethane casting. Preferably, the toroidal wheel component of this invention is one integral piece, fabricated of a single material in one piece rather than being a composite of two or more separately manufactured pieces.

The wheel of this invention is described herein as having medial components (on the side facing the inner side of the device to which it is affixed), and lateral components (on the side facing the outer side of the device to which it is affixed, however, preferably, the wheel is bilaterally symmetrical around its vertical central plane (as viewed when the wheel is in use rolling toward the viewer) and the lateral components of the wheel are identical to the medial components of the wheel.

In use, the toroidal wheel component of this invention has a hollow toroidal core with an outer circumference radially spaced apart (displaced) inwardly (toward the hub) from the outer circumference of the toroidal wheel component. The distance (displacement) between the outer circumference of the toroidal wheel component and the outer circumference of the core should be sufficient to provide an outer rim for the wheel having minimal rolling resistance and maximal abrasion resistance and structural strength to support the wheel. For example, for inline skate wheels this distance should be at least about ¼ inch and not more than about ½ inch, and preferably at least about ⅜ inch. For larger wheels, the preferred dimensions are scaled up proportionately. The cross-section of the hollow toroidal core is depicted herein as being circular, however, it can be square, oblong, elliptical, or irregular in shape as may be convenient for manufacture or optimized for deflection characteristics.

In use, the toroidal wheel component of this invention provides an inner circumference adapted to contact a wheel hub; preferably the inner circumference of the toroidal wheel component is flattened along the direction of the wheel axis as shown in FIGS. 1–5. This surface may be grooved, or may have an irregular shape as may be required to interface with the wheel hub, all as known to the art.

Radially spaced apart (displaced) from the inner circumference of the toroidal wheel component is the inner circumference of the hollow toroidal core. The distance (displacement) between the inner circumference of the hollow toroidal core and the inner circumference of the toroidal wheel component should be great enough to provide structural integrity to the wheel, but not so great as to reduce the volume of the toroidal core necessary to achieve the desired stiffness of the wheel. For example, for inline skates this distance is preferably at least about ⅛ inch to about ⅜ inch, and would be scaled up proportionately for larger wheels.

The toroidal wheel component of this invention is discontinuous along a line running from the inner circumference of the toroidal wheel component to the inner circumference of the hollow toroidal core. Preferably this discontinuity is in the form of a straight line such as could be produced by making a cut in the component in the plane normal to the wheel axis from the inner circumference of the toroidal wheel component to the inner circumference of the hollow toroidal core. However, this discontinuity may be jagged, arced, or otherwise, so long as the discontinuity defines two complementary edges which can be placed in abutment when the wheel is in use or in abutment with a spacer when a spacer is used. The edges are toroidal, i.e. they run around the entire inner circumference of the toroidal wheel component. Preferably these toroidal edges lie in continuous abutment with each other or with a spacer. The term "continuous abutment" means that the two edges when placed together touch each other at all points without leaving gaps between them, or when the two edges are separated by a spacer, each edge touches the spacer without gaps.

The two toroidal edges which lie in abutment with each other or with a spacer when the wheel is in use are spaced apart from the sides of the toroidal wheel component of the wheel a distance large enough to provide structural integrity to the wheel. For example, for inline skate wheels, the distance between the lateral surface of the component and the lateral toroidal edge is at least about 5/16 inch and preferably at least about 7/16 inch. Preferably the distance between the medial surface of the component and the medial toroidal edge is the same as that of the lateral edge; however, if convenience in manufacture requires otherwise, this distance may differ between the lateral and medial sides of the wheel. Further, these edges need not be perpendicular to the wheel axis and need not define straight lines so long as they run from the inner circumference of the hollow toroidal core to the inner circumference of the toroidal wheel component.

A preferred embodiment of the wheel of this invention comprises a lateral bearing hub abutting at least a portion of the lateral outer surface of the toroidal wheel component and a medial bearing hub abutting at least a portion of the medial outer surface of the toroidal wheel component. These may be separate lateral and medial bearing hubs, or a single, integral hub having lateral and medial sides designed such that the wheel can be forced into position and secure engagement with the hub. When two separate hubs are used, they should have means for engaging with each other, such as bolts or screws and appropriate bolt holes or screw holes, a threaded sleeve arrangement or other means known to the art.

When the toroidal wheel component as manufactured has the toroidal edges between its inner circumference and the inner circumference of the core spread apart as described above, the gap between the edges should be closed, e.g. by bringing the edges together prior to affixing the hubs. The edges would then be held in abutment under slight pressure. Alternatively, the toroidal edges may be brought into continuous abutment with a spacer placed between them. Such a spacer should be toroidal and have a cross-section corresponding to the shape and size of the space between the toroidal edges into which it is to be fitted. The spacer may have parallel edges, angled edges, curved or notched edges, etc. as required for being placed in continuous abutment with the toroidal edges of the wheel component of this invention. The spacer can be made of any material including rubber, plastic, metal, or closed-cell foam. The spacer preferably fits against the inner circumference of the hollow toroidal core to form an airtight or liquid-tight seal, although this is unnecessary when the stiffness-modulating material to be used is enclosed within a sealed toroidal container.

The wheel hubs may comprise means for engaging with the toroidal wheel component, such as the tongue and groove structures described hereinafter, or other such means as are known to the art.

Prior to bringing the toroidal edges together or inserting a spacer between the toroidal edges and affixing the wheel hubs to provide an enclosed hollow toroidal core, a stiffness-modulating (stiffness-modifying) material may be inserted into the hollow toroidal core to modify the overall stiffness properties of the wheel. This stiffness-modulating material may be any material having desired properties, such as gas at ambient pressure, or gas at greater than ambient pressure, e.g. at a pressure between about 5 psi and about 50 psi above ambient. The term "gas" includes air or other gaseous materials or mixtures thereof. The stiffness-modulating material may also be a polymeric foam such as polyethylene foam of about 1 to about 20 lb/ft$^3$, polyurethane foam of about 10 to about 60 lb/ft$^3$, or ethylvinylacetate (EVA) foam of about 5 to about 30 lb/ft$^3$, or other foams known to the art; a non-compressible liquid such as silicone gel or liquid; a metal toroid made of aluminum, stainless steel or other metal, or any other material having the desired stiffness properties.

The toroidal wheel component (outer portion) may be harder or softer than the stiffness-modulating material. For example, it may be desired to use a relatively soft outer material, such as rubber or soft polyurethane elastomer, coupled with a relatively hard stiffness-modulating material in the hollow core, such as aluminum, for comfort on smooth or minimally rough surfaces. Or it may be desired that the outer material be harder than the stiffness-modulating material, e.g., the outer material could be a hard polyurethane and the stiffness-modulating material could be air under pressure for comfort on a relatively rough surface.

The overall stiffness of the wheel is modulated by the material filling the hollow core and the relative sizes of the core and outer portion of the wheel according to principles well-known to the art. A rubber wheel with a metal-filled core can roll easily over a level, sandy surface, for example, as the rubber outer portion of the wheel can absorb the shock of the small grains of sand while the metal core provides structural integrity. On the other hand, on a rougher surface consisting of half-inch gravel on macadam, for example, a relatively thin outer shell of a hard material will deflect when it hits a rock, and the deflection can be absorbed by a relatively large air-filled core, again providing a smooth ride and good ability to roll over the surface. In a preferred embodiment, the toroidal wheel component (outer portion of the wheel) is made of a material having a Shore hardness between about 70 A and about 95 A, and preferably between about 75 A and about 85 A, as this provides good abrasion resistance and minimal rolling resistance. To improve deflection characteristics (shock absorption capability) of the overall wheel, the inner core may be filled with a softer material than the outer portion of the wheel, such as air under pressure, preferably at a pressure of between about 5 psi and about 50 psi above ambient.

The air or other gas at ambient or higher pressure may be enclosed in a sealed torus-shaped container, such as a polyurethane membrane. This container is then inserted into the hollow toroidal core of the toroidal wheel component of the wheel before bringing the edges into abutment with each other or with a spacer and affixing the wheel hubs. The stiffness-modulating material is a semi-permanent feature of the wheel in that the hubs can easily be removed and the material taken out and replaced with the same or a different stiffness-modulating material. For example, the user might wish to replace an air-filled container with a foam-filled container to provide greater overall stiffness for racing.

The toroidal wheel component of this invention may be made by any process known to the art, preferably by molding, and more preferably by liquid casting or injection molding the component in a mold shaped to produce the component with the toroidal edges spaced apart or angled apart from each other as described above. The mold preferably has a top and bottom half with a toroidal insert centrally disposed between the top and bottom half to form the hollow toroidal core. Methods for molding, including injection molding, are well known to the art.

The method comprises:
a) providing a mold having a shape corresponding to the toroidal wheel component wherein the medial and lateral edges are spread apart from each other;
b) introducing liquid or softened (non-solid) moldable material into the mold;
c) allowing the liquid or softened (non-solid) material to harden in the mold;
d) removing the hardened material from the mold whereby the hardened material has the shape of the toroidal wheel component.

The liquid or softened (non-solid) moldable material can be any known to the art including materials that can be poured or injected into a mold and react inside the mold to harden, for example as known to the cast polyurethane art, and softened materials such as molten pre-reacted polymers that cool to harden in the mold. Suitable materials include elastomers including natural rubber and thermoplastics. A preferred method of making the toroidal wheel component of this invention is by injection molding using softened polyurethane.

After the toroidal wheel component has been released from the mold, a stiffness-modulating material may be inserted into the core, the edges aligned and abutted with each other or with a spacer, and means for maintaining the abutment applied. Any means known to the art for maintaining the edges together may be used, including adhesives, interlocking geometries and the like. Preferably wheel hubs engaging with the toroidal wheel component as described herein are used.

DETAILED DESCRIPTION OF THE PREFERRED EMBODIMENTS

Figure 1:
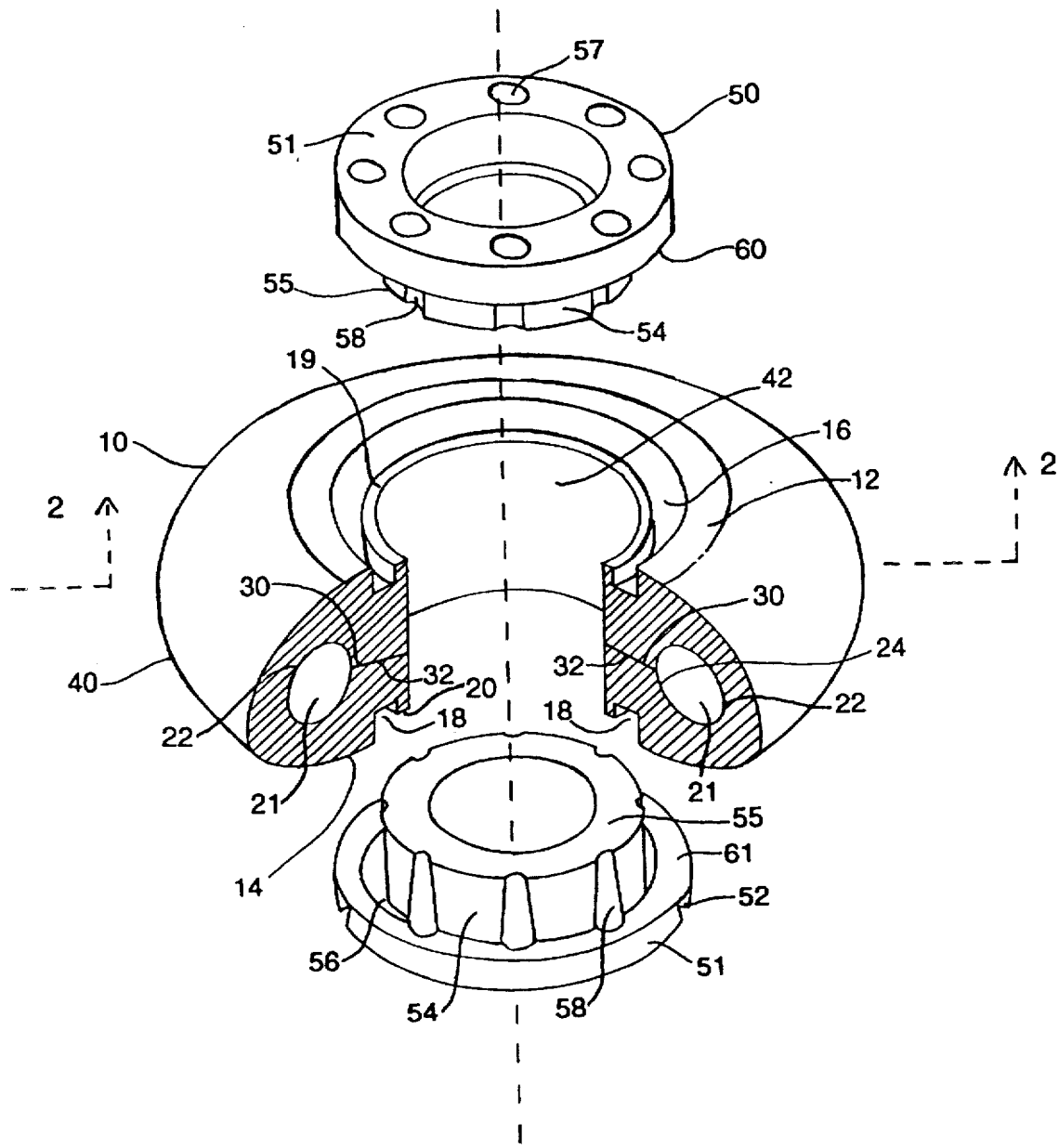
FIG. 1 is an exploded view of the wheel of this invention comprising the toroidal wheel component (shown with a segment removed so that the hollow toroidal core can be seen) and also comprising the hubs.

The wheel of this invention as shown in FIGS. 1, 2, 3, 4 and 5 comprises a toroidal wheel component 10 having a lateral outer surface 12 and a medial outer surface 14, a lateral wheel hub 50 and a medial wheel hub 52. The toroidal wheel component 10 is equipped with a lateral groove 16 for receiving the lateral hub lip 60 and with a medial groove 18 for receiving medial hub lip 61. The inner wall of lateral groove 16 is formed by lateral wheel lip 19, and the inner wall of medial groove 18 is formed by medial wheel lip 20.

The toroidal wheel component 10 comprises a hollow toroidal core 21. The core's outer circumference 22 is radially displaced from the toroidal wheel component outer circumference 40. The core's inner circumference 24 which is formed by the abutment of toroidal lateral inner edge 30 and toroidal medial inner edge 32 is radially displaced from the toroidal wheel component inner circumference 42.

Figure 2:
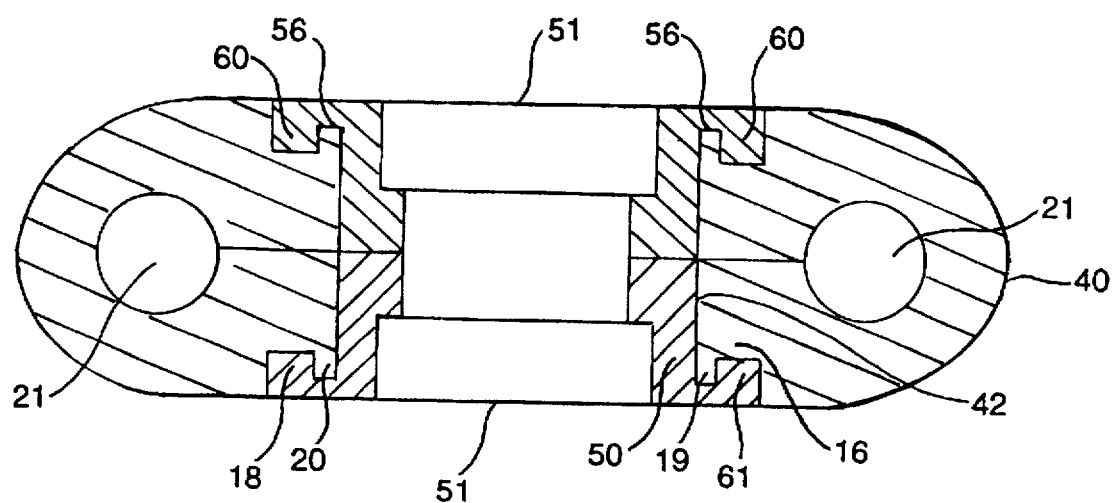
FIG. 2 is a cross sectional view along line 2—2 of FIG. 1 showing the hubs in place on the toroidal wheel component.

Lateral wheel hub 50 comprises a hub top 51 and a hub shaft 54 terminating in a hub shaft edge 55. The hub top 51 overhangs (as best seen in FIG. 2) to form lateral hub lip 60. Similarly, medial wheel hub 52 comprises a hub top 51 and a hub shaft 54 terminating in a hub shaft edge 55. The hub top 51 overhangs to form medial hub lip 61. Radially inward from medial hub lip 61 is hub groove 56 as seen in FIGS. 1 and 2. Lateral wheel hub 50 which is symmetrical with or identical to medial wheel hub 52 also comprises a hub groove 56, as seen in FIG. 2.

Wheel hubs 50 and 51 also comprises bolt holes 57, and the hub shaft 54 of each wheel hub comprises bolt grooves 58.

Figure 3:
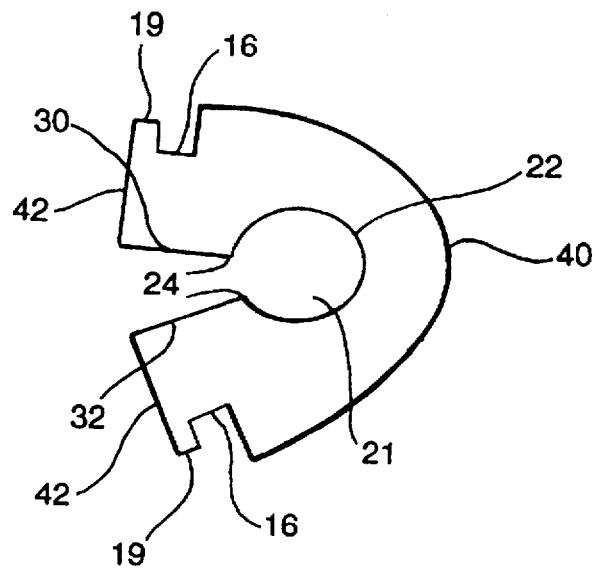
FIG. 3 is a cross-section of the portion of the toroidal wheel component shown on the right side of FIG. 2 depicted in spread-apart configuration prior to engagement with the hubs.

As shown in FIG. 3, the toroidal wheel component is manufactured with the toroidal lateral and medial edges 30 and 32 spaced apart; in this view, the edges are angled apart. The core inner circumference 24 is thus broken in the component as manufactured.

Figure 4:
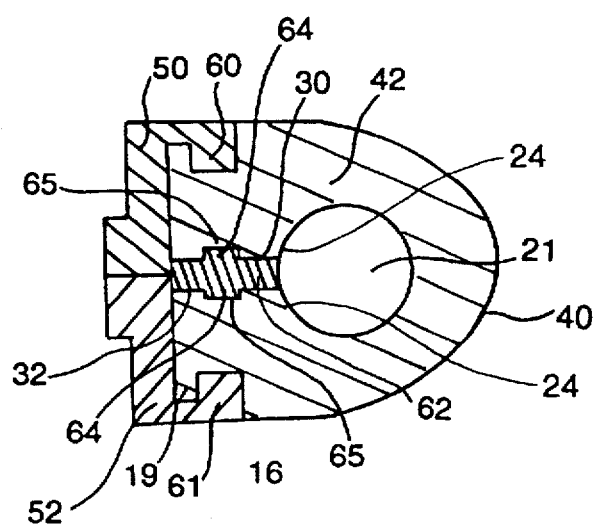
FIG. 4 is a cross-section of the toroidal component corresponding to that of FIG. 3 showing an embodiment in which the toroidal edges of the toroidal wheel component are parallel and separated by a spacer with which said edges lie in continuous interlocking abutment.

As shown in FIG. 4, the toroidal wheel component can be manufactured with the toroidal lateral and medial edges 32 parallel to each other. In this embodiment, the toroidal lateral edge 30 is shown abutting one side of a spacer 62, while toroidal medial edge 32 abuts the other side of the spacer 62. The spacer 62 and toroidal edges 30 and 32 have interlocking geometries. Shown in FIG. 4 is a toroidal edge groove 65 in medial toroidal edge 32 and another toroidal edge groove 65 in lateral toroidal edge 30 interlocking with spacer tongues 64.

Figure 5:
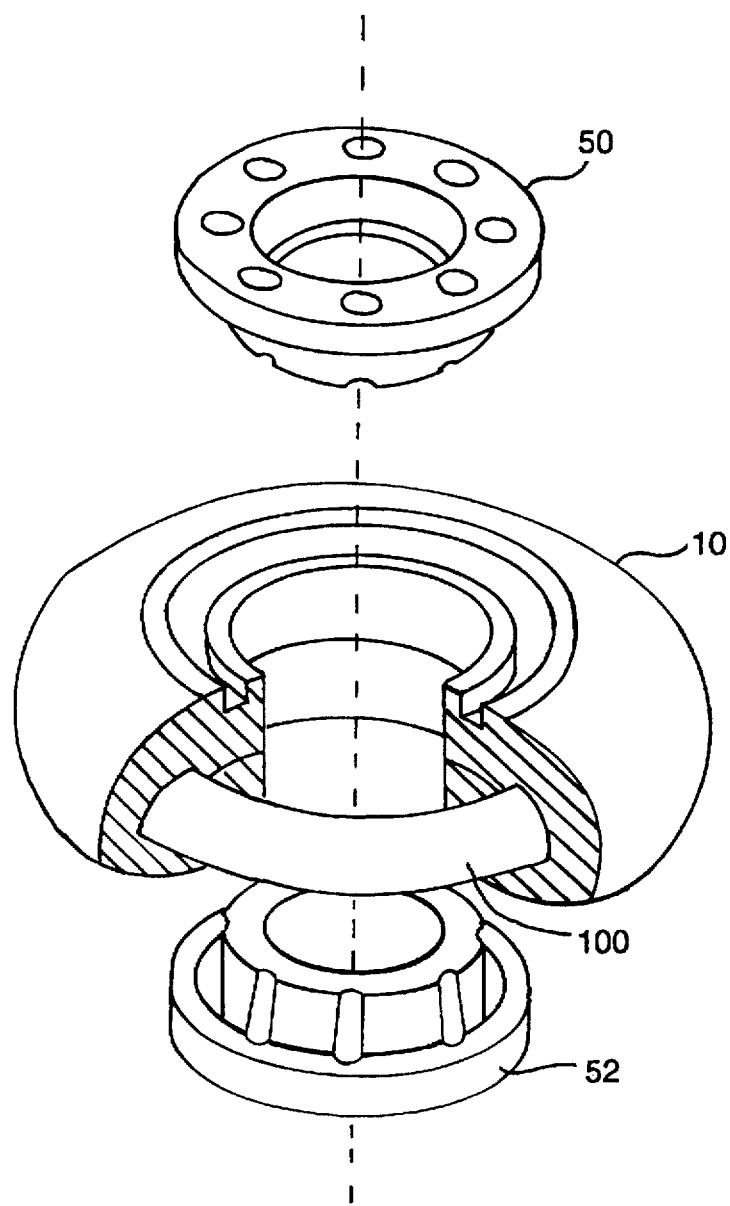
FIG. 5 shows the wheel of this invention as shown in FIG. 1 having a stiffness-modulating material inserted in the hollow toroidal core.

FIG. 5 shows a stiffness-modulating material 100 filling the hollow toroidal core of toroidal wheel component 10.

Figure 6:
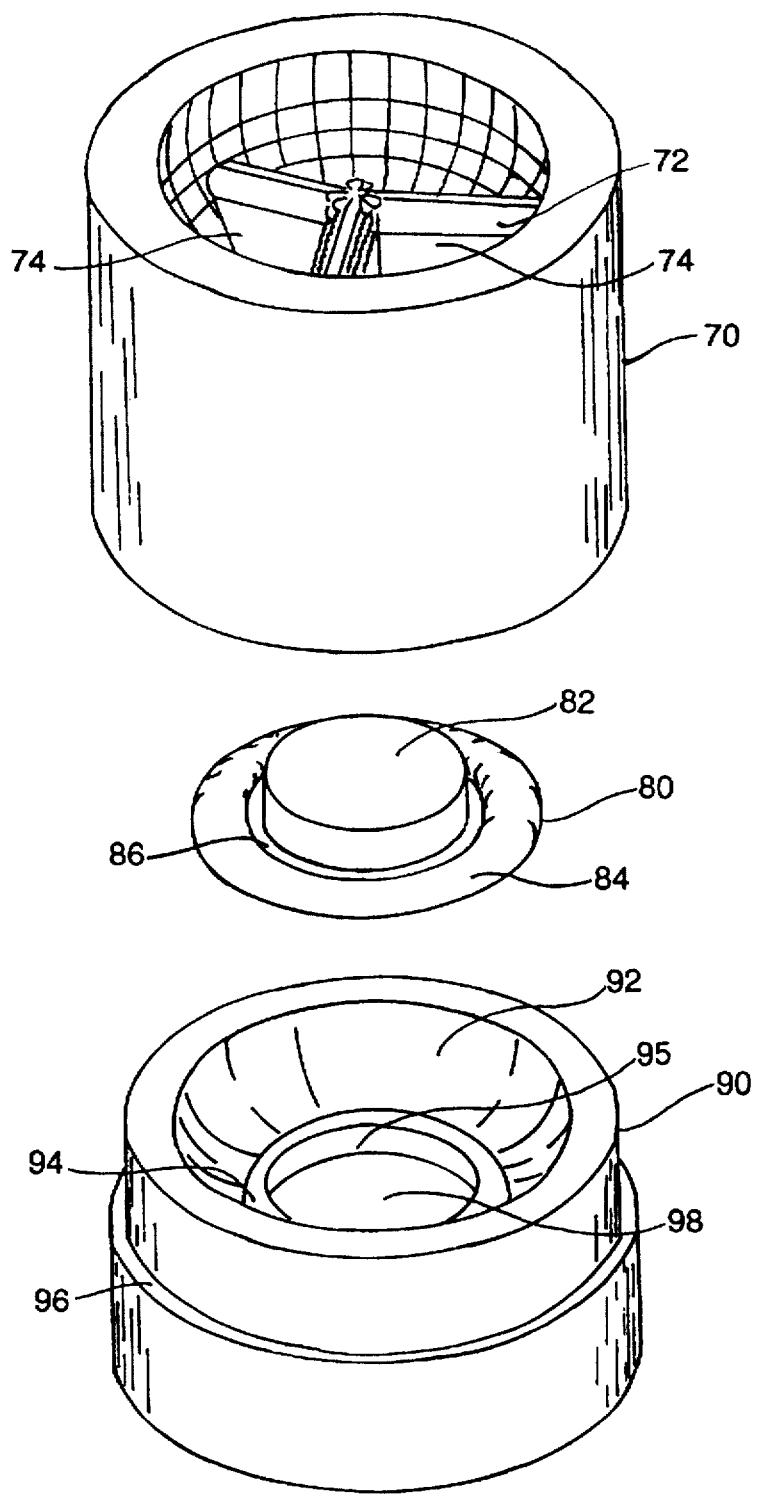
FIG. 6 is an exploded view of the mold used to make the toroidal wheel component of this invention.

The toroidal wheel component 10 is preferably manufactured by injection molding in a mold as depicted in FIG. 6. The mold comprises mold top 70, struts 72, and walls 74 supporting the structure.

The mold also comprises mold insert 80 comprising insert shaft 82 which also extends downwardly (not shown), core chamber space filler 84, and toroidal edge filler 86. Mold insert 80 is symmetrical and has identical features when seen from the bottom, as when seen from the top.

The mold further comprises mold bottom 90, comprising rounded wheel surface mold 92, flat mold rim 94, inner wall 95, support ledge 96, and bottom surface 98.

In use, the toroidal mold insert 80 is placed into mold bottom so that insert shaft 82 at the bottom of mold insert 80 rests on bottom surface 98. Inner wall 95 is less tall than the bottom portion of mold shaft 82 of the insert and toroidal edge filler 86 of the insert is spaced above flat surface 94. Mold top 70 is then placed over mold bottom 90 so that the bottom surface of mold top 70 rests on support ledge 96. Molten polyurethane is then injected into the top of mold top 70 and allowed to flow into all the free spaces in mold bottom 90, around mold insert 80, and fill in mold top 70. The toroidal wheel component is thereby formed by rounded wheel surface mold 92 in mold bottom 90 and a similar rounded structure in mold top 70. The hollow toroidal core 21 of the toroidal wheel component 10 is formed by core chamber space filler 84 and the lateral and medial toroidal edges 30 and 32 of the toroidal wheel component 10 and the space between them is formed by toroidal edge filler 86. The molten polyurethane is allowed to cool in the mold and the mold is disassembled and the toroidal wheel component 10 removed.

The toroidal wheel component 10 and hollow toroidal core 21 formed in the mold have an unbroken toroidal wheel component outer circumference 40 and core outer circumference 22; however, as formed in the mold, the core inner circumference 24 is broken by reason of fabrication of the toroidal wheel component 10 with its toroidal lateral inner edge 30 spread apart from its toroidal medial inner edge 32 as shown in FIG. 3.

In use, the lateral wheel hub 50 and medial wheel hub 52 are placed on the toroidal wheel component 10 with the hub shaft edges 55 abutting. Lateral hub lip 60 engages with lateral groove 16 and medial hub lip 61 engages with medial groove 18, while lateral wheel lip 19 engages with hub groove 56 of lateral wheel hub 50, and medial wheel lip 20 engages with hub groove 56 of medial wheel hub 52. This brings toroidal lateral inner edge 30 into continuous abutment with toroidal medial inner edge 32 such that hollow core 21 assumes the shape of a torus. Lateral wheel hub 50 and medial wheel hub 52 are engaged with each other, preferably by screws or bolts (not shown) accommodated in bolt holes 57 and bolt grooves 58.

Prior to bringing toroidal lateral inner edge 30 and toroidal medial inner edge 32 together, as seen in FIG. 5, a stiffness-modulating material 100 may be inserted into hollow toroidal core 21 by stretching the edges farther apart and popping the stiffness-modulating material 100 into place. The stiffness-modulating material 100 may be similarly removed and a different stiffness-modulating material inserted in its stead.

We claim:

1. A wheel assembly comprising:
   (a) a toroidal wheel component having a Shore hardness between about 70 A and about 95 A formed of a single integral piece having a lateral outer surface and a medial outer surface, which is adapted during use to define a hollow toroidal core, said toroidal wheel component adapted to have, during use, an outer circumference for rolling on a surface, and an inner circumference adapted to contact a wheel hub, and said hollow toroidal core having an outer circumference radially displaced from the outer circumference of said component and adapted to have, during use, an inner circumference radially displaced from the inner circumference of said component, wherein said component is discontinuous between said component inner circumference and said toroidal core inner circumference and has a toroidal lateral inner edge displaced from the lateral outer surface and a toroidal medial inner edge displaced from the medial outer surface, which edges which are adapted, during use, to lie parallel to each other; and
   (b) a replaceable toroidal component comprising a stiffness-modulating material inserted into said toroidal hollow core in use; and
   (c) wherein said replaceable toroidal component is selected from a group of components having varying stiffness modulating properties in order to change the resiliency of the wheel assembly.

2. A skate wheel comprising the wheel assembly of claim 1.

3. The wheel of claim 2 also comprising a spacer between said toroidal lateral inner edge and said toroidal medial inner edge.

4. The wheel of claim 2 also comprising a lateral bearing hub abutting at least a portion of the lateral outer surface of said component and a medial bearing hub abutting at least a portion of the medial outer surface of said component, said hubs comprising means for engaging with each other, whereby said lateral inner edge and said medial inner edge are held parallel to each other.

5. The wheel of claim 4 wherein said lateral outer surface of said component comprises means for engaging said lateral surface with said lateral bearing hub and said medial outer surface of said component comprises means for engaging said medial outer surface with said medial bearing hub.

6. The wheel assembly of claim 1 wherein the toroidal wheel component formed of a single integral piece is made from polyurethane.

7. The wheel of claim 2 comprising a toroidal container disposed within said hollow core, containing a gas at greater than ambient pressure enclosed within said toroidal container.

8. The wheel of claim 2 wherein said stiffness-modulating material is a non-compressible liquid.

9. The wheel of claim 2 wherein said stiffness-modulating material is a polymeric foam.

10. The wheel of claim 2 wherein said stiffness-modulating material is metal.

11. A method for molding a toroidal wheel component of claim 1 comprising:
    a) providing a mold having a shape corresponding to said toroidal wheel component wherein said medial and lateral edges are spread apart from each other;
    b) inducing a moldable material into said mold;
    c) allowing said material to harden in said mold;
    d) removing said hardened material from said mold whereby said hardened material has the shape of said toroidal wheel component.

12. The method of claim 11 wherein said moldable material is a plastic induced into said mold by injection.

13. The method of claim 11 wherein said moldable material is a liquid material induced into said mold by pouring.

14. The method of claim 11 further comprising:
    aligning the lateral and medial edges of said toroidal wheel component in abutment; and
    maintaining said lateral and medial edges in abutment by engaging hub means with said component whereby said medial edges are held in abutment.

15. The method of claim 14 further comprising inserting a stiffness-modulating material into the space adapted to define said toroidal hollow core.

16. The method of claim 11 further comprising:
    placing an insert into abutment with the lateral and medial edges of said component; and
    engaging with said component means for maintaining said lateral and medial edges in abutment with said spacer.

17. The method of claim 16 further comprising inserting a stiffness-modulating material into the space adapted to define said toroidal hollow core.

18. A method for modulating the stiffness of a wheel of claim 1 comprising:
    a) inserting a stiffness-modulating material into said hollow toroidal core; and
    b) bringing said toroidal medial inner edge and said toroidal lateral edge into abutment with each other or with a spacer and maintaining said edges in said abutment.

19. The method of claim 18 comprising first removing a first stiffness-modulating material from said hollow core, prior to inserting the stiffness-modulating material of step a) wherein said inserted stiffness-modulating material has a different stiffness from said first stiffness-modulating material.

20. A wheel assembly comprising:
    (a) a toroidal wheel component having a Shore hardness between about 70 A and about 95 A formed of a single integral piece having a lateral outer surface and a medial outer surface, which is adapted during use to define a hollow toroidal core, said toroidal wheel component adapted to have, during use, an outer circumference for rolling on a surface, and an inner circumference adapted to contact a wheel hub, and said hollow toroidal core having an outer circumference radially displace from the outer circumference of said component and adapted to have, during use, an inner circumference radially displaced from the inner circumference of said component, wherein said component is discontinuous between said component inner circumference and said toroidal core inner circumference and has a toroidal lateral inner edge displaced from the lateral outer surface and a toroidal medial inner edge displaced from the medial outer surface; and (b) a toroidal spacer lying between and in continuous abutment with said edges; and (c) a replaceable toroidal component comprising a stiffness-modulating material inserted into said toroidal hollow core in use; and (d) wherein said replaceable toroidal component is selected from a group of components having varying stiffness modulating properties in order to change the resiliency of the wheel assembly.

21. A wheel assembly of claim 20 wherein said stiffness-modulating material disposed within said hollow toroidal core has a hardness greater than that of said toroidal wheel component.

22. The wheel assembly of claim 20 wherein component (a) is made of rubber.

23. The wheel assembly of claim 20 wherein component (a) is made from polyurethane elastomer.

24. The wheel assembly of claim 20 wherein said stiffness-modulating material is metal.

* * * * *